United States Patent

Pan

[11] Patent Number: 5,916,531
[45] Date of Patent: Jun. 29, 1999

[54] SPIRAL FIXED-BED MODULE FOR ADSORBER AND CATALYTIC REACTOR

[76] Inventor: Chuen Yong Pan, 11243-35 Avenue NW, Edmonton, Alberta, Canada, T6J 3M8

[21] Appl. No.: 08/848,647

[22] Filed: Apr. 29, 1997

[51] Int. Cl.[6] .............................. B01J 8/02; B01D 29/07; B01D 53/14
[52] U.S. Cl. ...................... 422/211; 422/218; 422/177; 422/181; 55/520; 210/304; 210/321.8; 210/502.1
[58] Field of Search ..................................... 422/211, 218, 422/181, 177, 171, 222; 210/502.1, 304, 321.8; 55/520; 96/192

[56] References Cited

U.S. PATENT DOCUMENTS

| 5,139,668 | 8/1992 | Pan et al. | 210/321.8 |
| 5,338,450 | 8/1994 | Maurer | 210/286 |
| 5,651,800 | 7/1997 | Mizuno et al. | 48/94 |

*Primary Examiner*—Hien Tran

[57] ABSTRACT

A spiral fixed-bed module used to provide contact and interaction between a fluid stream and solid particles, comprises a fluid distribution element formed by a pair of laterally coextensive envelope-like fluid communication channels being spirally wound into a cylindrical structure with adjacent layers spaced apart forming spiral loops of spaces of uniform width. The element is then disposed in a cylindrical casing, and immobilized therein by packing solid particles into the spaces between the layers of the spiral channels, and the spaces between external surfaces of the element and inner surfaces of the casing. A fluid stream introduced into a first of the channels will be directed to flow through the solid particle layers via the porous side walls of the distribution channels, and exit from the second channel. The module packed with adsorbent particles provides a thin-bed adsorber, and can use very small adsorbent particles for efficient adsorption without giving rise to high pressure drop. Alternatively, the module may be packed with catalyst particles to provide an effective catalytic reactor with improved mass transfer between the catalyst particles and surrounding fluid stream containing the reactants.

6 Claims, 3 Drawing Sheets

SPIRAL FIXED-BED MODULE FOR ADSORBER AND CATALYTIC REACTOR

FIELD OF THE INVENTION

This invention relates to a fixed-particle-bed module embedded with a spiral network of fluid communication channels to distribute fluid flow uniformly through thin layers of minute solid particle packing to provide effective contact and interaction between the solid particles and a particular component or components of a fluid stream.

BACKGROUND OF THE INVENTION

Adsorption processes are widely used in industry for separation and purification of fluid mixtures. The separation is based on preferential adsorption of adsorbable components on the active surface of solid adsorbent particles. For efficient adsorption, the adsorbent must have large active surface areas with high adsorptive capacity. The commonly used adsorbents, such as molecular sieve zeolites, activated carbon, alumina and silica gel, have adsorptive areas of at least 200 m$^2$/g. Most of these areas are located at the interior of the porous adsorbent particles.

Most industrial adsorption processes are carried out in a fixed-bed adsorber, wherein the adsorbent granules are packed and immobilized in a cylindrical vessel. As a fluid mixture to be separated or purified is passed through the adsorbent packing via the void spaces among the granules, the adsorbable components in the mixture are taken up and retained by the adsorbent. Apart from the adsorptive capacity of the adsorbent material, adsorption rate and pressure drop are two important factors that must be considered in adsorber design.

Pressure drop through the adsorber column should be minimized to reduce fluid pumping and compression costs. In addition, high pressure drop can cause movement or fluidization of the adsorbent particles, resulting in serious attrition and loss of the adsorbent material.

Adsorption rate has a significant bearing on the efficiency of the adsorption process. The rate is usually determined by the mass transfer resistance between the bulk fluid phase and the internal adsorption surfaces of the adsorbent particles. Slow adsorption rate due to large mass transfer resistance will result in a long mass transfer zone (MTZ) migrating through the adsorber column in the direction of the fluid stream during the course of the adsorption operation. The adsorbent in the region upstream of the MTZ is substantially saturated with adsorbate, while that downstream of the MTZ is essentially free of adsorbate. Within the MTZ, the adsorbent is only partially saturated with adsorbate. The adsorption step must be terminated just before the leading edge of the MTZ reaches the adsorber outlet in order to avoid the breakthrough of adsorbate in the effluent stream. A long MTZ which contains a large quantity of the partially utilized adsorbent will, therefore, result in inefficient use of the adsorption capacity.

Both the pressure drop and the mass transfer resistance are strongly influenced by the size of the adsorbent particles. Changing the particle size, unfortunately, has opposite effects on these two important design factors. This elaborated below:

a) The size of the interstitial void spaces among the adsorbent particles in a fixed-bed packing is proportional to the size of the particles. Since the resistance to the fluid flow through the adsorbent packing is inversely proportional to the size of these void spaces, the use of small adsorbent particles will cause high pressure drop. For this reason, the sizes of particles of commercial adsorbents for fixed-bed adsorber operation are generally larger than 2~3 mm in diameter. Adsorbents of smaller particle sizes, such as zeolite crystals (less than 10 micrometer), are pelletized using binding material to suitable sizes.

b) Almost all the surface areas of commercial adsorbents are located at the interior of the adsorbent particle. For adsorption to occur, the adsorbate needs to be transported from the external fluid stream to the interior surface of the particle. The transport rate is generally dominated by two mass transfer mechanisms in series: (a) interfacial mass transfer—diffusion through the fluid boundary layer surrounding the external surface of the adsorbent particle; and (b) intraparticle mass transfer—diffusion through the internal pore space (micropores and macropores) of the particle to its interior surface where adsorption takes place. The size of the particle has significant effects on the rates of these two diffusion processes. Small particles not only offer large fluid/solid contact areas for interfacial mass transfer, but also reduce the path length for intraparticle diffusion. Hence, small adsorbent particles will increase adsorption rate and result in a narrow MTZ for efficient adsorption operation.

The above analysis indicates that small adsorbent particles are desirable for efficient adsorption, but the minimum particle size is limited by acceptable hydrodynamic operating conditions of the fixed-bed adsorber. Such a concept also applies to other processes requiring effective contact and interaction between a fluid stream and solid particles, such as a heterogeneous catalytic reaction process involving an adsorption step in the reaction mechanism. The use of small catalyst particles will enhance mass transfer between the catalyst and surrounding fluid carrying the reactants, but it will also increase pressure drop through the reactor bed.

It would, therefore, be desirable to provide a fixed-bed module containing adsorbent or catalyst characterized by a relatively small particle size and yet still able to operate with an acceptable pressure drop.

In a conventional fixed-bed module using small solid particles, in order to reduce pressure drop it is necessary to employ a thin-bed module with large cross sectional area to reduce the flow path length and velocity. This, however, will require a costly large-diameter pressure vessel to house the particles.

Two unconventional fixed-bed modules described in U.S. Pat. Nos. 5,139,668 (Pan and McMinis) and 5,338,450 (Maurer) can use very small solid particles without giving rise to high pressure drop. In Pan and McMinis, porous hollow fibers are used to immobilize minute solid particles inside the fiber lumina. The void spaces between the fibers provide an unobstructed passageway for fluid flow with low pressure drop. But such a module requires expensive and delicate hollow fibers to construct.

In Maurer, a single layer of adsorbent material is spirally wound into a cylindrical adsorber module, with adjacent spiral loops being separated by two layers of flow channels. The resulting adsorber can use minute adsorbent particles without high pressure drop, because it has large area of porous channel walls to distribute a fluid stream through a relatively thin layer of adsorbent packing. There are, however, a couple of disadvantages associated with the Maurer spiral-wound adsorber module. The available space within the module that can be packed with adsorbent is typically less than 50%, because the number of the flow channel loops is twice that of the adsorbent loops. These channels can easily occupy more than 50% of the total available space within the module (assuming that the thickness of the flow channel is half of that of the adsorbent layer as specified in the Maurer examples). Thus the adsorber has poor utilization of physical space for adsorbent packing, and requires a much larger housing vessel than the conventional column-type adsorber to accommodate a given adsorption capacity. A further disadvantage of the Maurer adsorber is that it does not have structural integrity necessary for high pressure operation, such as pressure swing adsorption. This is because the periphery of the spiral-wound structure is not totally supported by the housing vessel. Any internal pressure within the flow channel will force the spiral structure to unfold and disintegrate. Hence, the adsorber can only be used for the thermal swing adsorption process (no pressure swing) as specified by Maurer.

Accordingly, the objects and advantages of the present invention are:

a) to provide a spiral fixed-bed module that can function as the conventional thin-bed module for effective fluid/particles contact and interaction, but without the need for a large-diameter pressure vessel;

b) to provide a spiral fixed-bed module with high particle packing capacity; and c) to provide a spiral fixed-bed module with high pressure operation capability.

SUMMARY OF THE INVENTION

In accordance with the invention, a spiral fixed-bed module comprises a fluid distribution element having a pair of fluid communication conduits and a pair of laterally coextensive envelope-like fluid distribution channels, each channel having two rectangularly shaped porous side walls being spaced apart forming an enclosed passageway of substantially uniform width. These two coextensive channels are taken together in overlapping arrangement and spirally wound into a cylindrical structure with adjacent layers of the spiral channels being spaced apart forming spiral loops of spaces of substantially uniform width for subsequent solid particle packing. Each of these channels has an inner spiral end at about the center of the spiral structure and an outer spiral end at the periphery. Both channels have each a spiral end being extended lengthwise into and adapted to communicate with the two conduits, respectively. The resulting element is disposed inside a cylindrical casing having an end cover equipped with an inlet and an outlet adapted to communicate, respectively, with the two conduits. The element is then immobilized and supported inside the casing by simply packing minute solid particles into the spiral loops of spaces between the layers of the spiral channels, and the surrounding space of the fluid distribution element inside the casing.

To provide interaction between a feed stream and the solid particles, the feed stream is directed to flow through the particle layers via the conduits and the porous side walls of the distribution channels. As used in this description and in the appended claims, the word "interaction" means adsorption or catalytic reaction.

The present invention provides a spiral fixed-bed module, wherein the adjacent loops of the particle layers are separated by only a single loop of the fluid distribution channel. This reduces the empty spaces inside the module by about 50% as compared to the Maurer module wherein the adjacent loops of the particle layer are separated by two loops of the fluid distribution channels. In addition, since the entire spiral-wound structure of the present invention is supported and immobilized by the particle packing, the fluid distribution channels can be pressurized without forcing the spiral structure to unfold.

Thus the present invention provides a spiral fixed-bed module having the following improved features: (a) increased particle packing capacity as compared to the Maurer module due to about 50% reduction of the spaces occupied by the fluid distribution channels; (b) capability for high pressure operation, such as pressure swing adsorption.

DESCRIPTION OF THE PREFERRED EMBODIMENT

Figure 1:
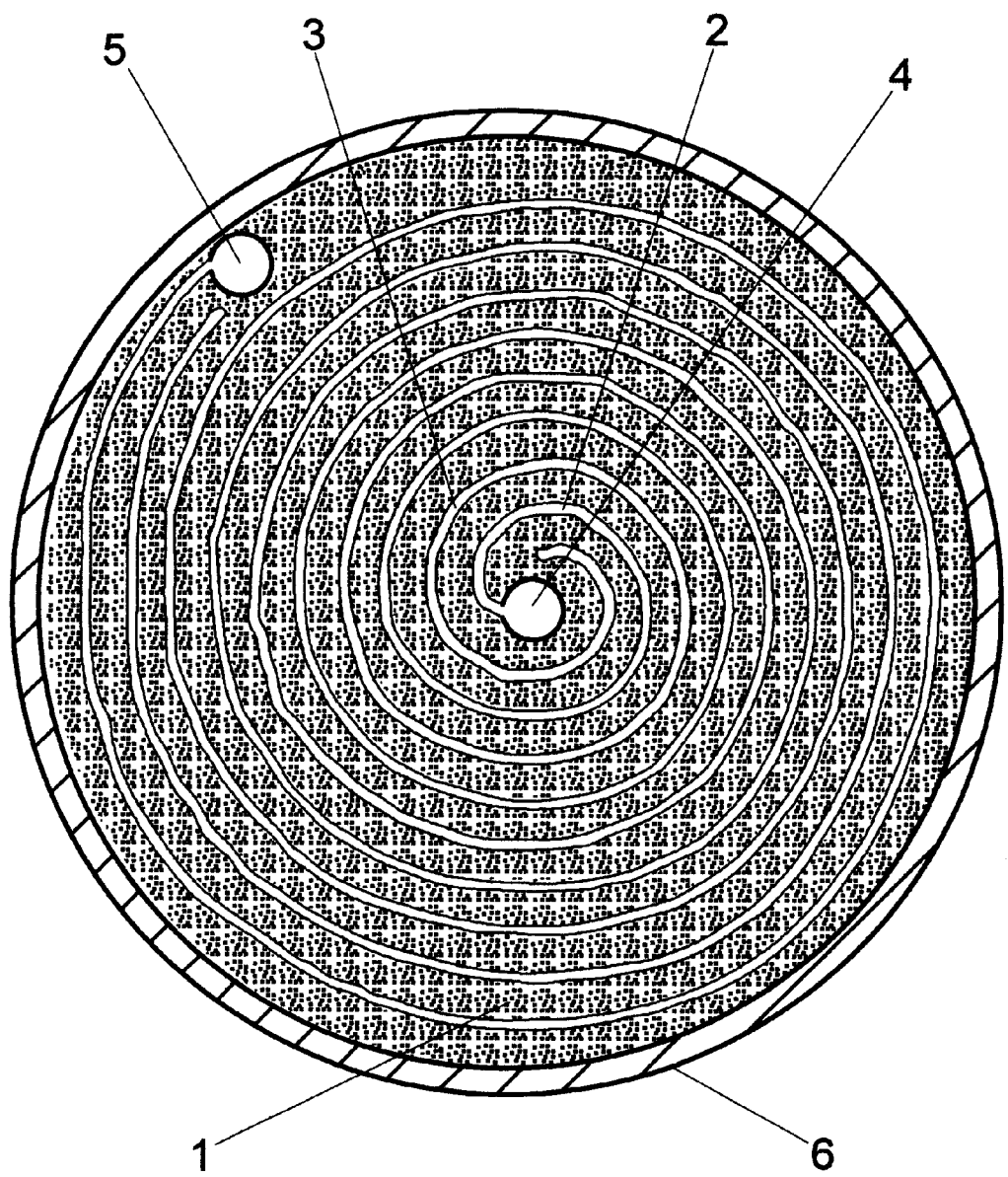
FIG. 1 is a transverse section view of a cylindrically shaped spiral fixed-bed module in accordance with the invention.
Figure 2:
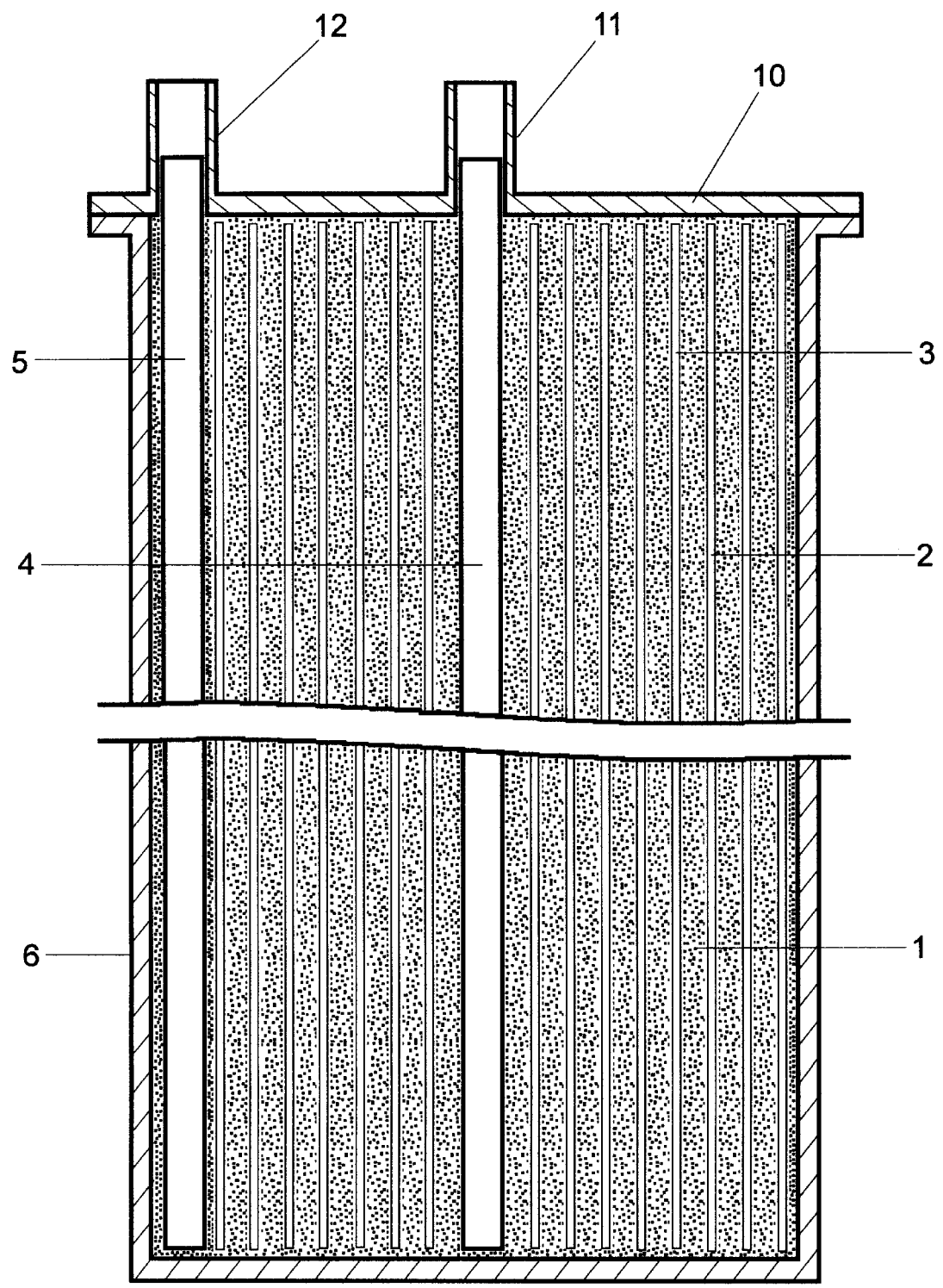
FIG. 2 is a longitudinal section view of the spiral fixed-bed module.

FIGS. 1 and 2 illustrate, respectively, the transverse and longitudinal section views of a spiral fixed-bed module of the present invention. The module comprises a pair of fluid distribution inlet and outlet channels 2 and 3 in spiral-wound configuration. Each of these channels has an inner spiral end at about the center of the spiral structure and an outer spiral end at the periphery. The adjacent loops of these channels are spaced apart forming spiral loops of spaces of substantially uniform width for solid particle packing 1. Each of these channels, if unfolded, is of the shape of a rectangular envelope with two porous side walls being spaced apart by a spacer forming an enclosed fluid passageway. The inner spiral end of the channel 2, and the outer spiral end of the channel 3 are extended lengthwise into and adapted to communicate with inlet and outlet conduits 4 and 5, respectively. The entire spiral structure is disposed inside a cylindrical casing 6 having an end cover 10 equipped with an inlet 11 and an outlet 12 adapted to communicate, respectively, with the conduits. A charge of minute solid particles 1 packs the spiral loops of spaces, and the surrounding space of the fluid distribution element inside the casing.

Figure 3:
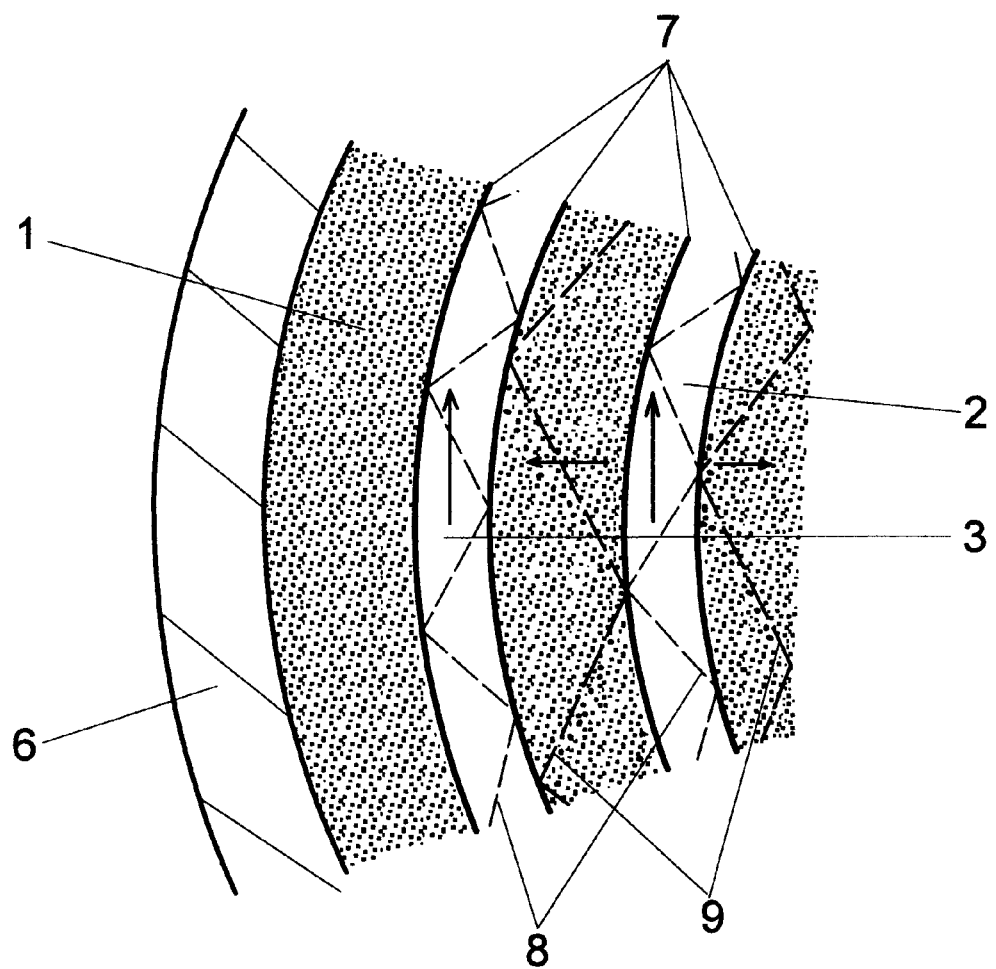
FIG. 3 is a schematic showing the structure of the fluid distribution channels and particle packing inside the spiral fixed-bed module.

FIG. 3 illustrates the detail structure of the fluid distribution channels 2 and 3 and particle packing 1. Each channel has two porous side walls 7 being spaced apart by a spacer 8 forming a fluid passageway of uniform width. The pore size of the channel wall is chosen to be smaller than the particles to prevent the particles from entering the distribution channel. The spacer 9 embedded in the particle packing 1 between the two distribution channels 2 and 3 is for the sole purpose of providing spaces for loading the particles. After the loading, the entire spiral-wound structure is securely supported and immobilized inside the casing by the particle packing.

When the spiral fixed-bed module is used as an adsorber, the solid particles will be adsorbent particles, preferably selected from the group consisting of activated alumina, activated carbon, silica gel, and molecular sieve zeolites. When the module is packed with catalyst particles, it can be used as a catalytic reactor.

Typically, the solid particle size will be 0.002 to 1.0 mm. The optimum width of the spiral loop of space for particle packing will be proportional to the size of the particles used in the module, and preferably in the range of 2 to 600 mm.

The width of the passageway inside the fluid distribution channel is preferably 2 to 300 mm.

A feed stream introduced into the conduit 4 will be directed to flow along the channel 2, then through the two porous side walls of the channel 2, the interstitial void spaces of the solid particles packed on both sides of the channel 2, the porous side walls of the channel 3, and exit via the channel 3 and conduit 5. During the course of flowing through these media, the fluid/solid contact and interaction take place in two different manners: (a) direct fluid/solid contact as the fluid passes through the particle layers; (b) indirect fluid/solid contact due to diffusion across the porous channel walls as the fluid flows along the channel passageway.

For ease of manufacturing, the spiral fixed-bed module may be constructed with both conduits being located at the center or the periphery of the spiral structure. But the preferred configuration is that shown in FIG. 1, wherein the two conduits are located at the opposite spiral ends. That is, if one conduit is located at the center of the spiral, then the other conduit is at the periphery of the spiral. In such a configuration, all fluid streams flowing between the two conduits will have substantially the same total flow path length along the two channels, regardless where they pass through the particle layer. For example, the stream that flows through the particle layer near the conduit 4 will have to travel the entire length of the channel 3, and the stream that flows through the particle layer at the mid-point of the spiral channels will have to travel half length of the channel 2 plus half length of the channel 3 before it reaches the conduit 5. There are two advantages for this type of flow pattern: (a) all fluid streams flowing between the two conduits have the same fluid/solid interaction due to same direct and indirect contact times with the solid particles; (b) uniform fluid flow distribution throughout the particle bed due to uniform flow path length.

The scope of the invention is defined by the claims now following.

The embodiments of the invention in which an exclusive property or privilege is claimed are defined as follows:

1. A spiral fixed-bed module used to provide interaction between solid particles and a particular component or components of a feed stream, comprising:

a) a cylindrical casing having an inlet and an outlet adapted to have the feed stream flow therethrough;

b) a fluid distribution element having a pair of fluid communication conduits and a pair of laterally coextensive fluid distribution channels, each channel having two generally rectangularly shaped porous side walls being spaced apart by a first spacer forming an enclosed passageway of substantially uniform width, said channels being taken together in overlapping arrangement and spirally wound into a cylindrical structure with every loop of one channel being spaced from an adjacent loop of the other channel by a second spacer forming spiral loops of spaces of substantially uniform width, each of said channels having an inner spiral end at about the center of the cylindrical structure and an outer spiral end at the periphery, and said channels having each a spiral end being extended lengthwise into and adapted to communicate with said conduits, respectively;

c) said fluid distribution element being disposed inside said casing, and said conduits being in fluid communication with said inlet and said outlet, respectively;

d) a charge of solid particles packing the spiral loops of spaces, and the surrounding space of said fluid distribution element inside said casing;

e) the pore size of said porous side walls being smaller than said solid particles wherein the size of said solid particles is in the range of 0.002 to 1.0 mm.

2. The spiral fixed-bed module as set forth in claim 1 wherein said solid particles are adsorbent particles adapted to adsorb an adsorbate in the feed stream.

3. The spiral fixed-bed module as set forth in claim 2 wherein said adsorbent particles are selected from the group consisting of activated alumina, activated carbon, silica gel, and molecular sieve zeolites.

4. The spiral fixed-bed module as set forth in claim 1 wherein said solid particles are catalyst particles adapted to catalyze a reaction between reactants in the feed stream.

5. The spiral fixed-bed module as set forth in claim 4 wherein the surface area of said catalyst particles is at least about 200 m$^2$/g.

6. The spiral fixed-bed module as set forth in claim 1 wherein the width of the space between the adjacent loops of said channels is in the range of about 2 to 600 mm, and the width of the enclosed passageway is in the range of about 2 to 300 mm.

* * * * *